United States Patent
Tabet et al.

(10) Patent No.: US 10,542,535 B2
(45) Date of Patent: *Jan. 21, 2020

(54) NON-PDCCH SIGNALING OF SIB RESOURCE ASSIGNMENT

(71) Applicant: Apple Inc., Cupertino, CA (US)

(72) Inventors: Tarik Tabet, Los Gatos, CA (US); Awais M. Hussain, Milpitas, CA (US); Syed Aon Mujtaba, Santa Clara, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,030

(22) Filed: Sep. 27, 2018

(65) Prior Publication Data

US 2019/0037544 A1 Jan. 31, 2019

Related U.S. Application Data

(63) Continuation of application No. 15/175,102, filed on Jun. 7, 2016, now Pat. No. 10,091,775.
(Continued)

(51) Int. Cl.
*H04W 72/04* (2009.01)
*H04W 48/12* (2009.01)

(52) U.S. Cl.
CPC .......... *H04W 72/042* (2013.01); *H04W 48/12* (2013.01)

(58) Field of Classification Search
CPC .................................................. H04W 72/04
See application file for complete search history.

(56) References Cited

U.S. PATENT DOCUMENTS 8,412,211 B2 4/2013 Petrovic
8,724,448 B2 5/2014 Roessel et al.
(Continued)

FOREIGN PATENT DOCUMENTS

CN 102624489 A 8/2012
CN 103828457 A 5/2014
(Continued)

OTHER PUBLICATIONS

Fujitsu, "On support of low-cost MTC terminals with reduced TX/RX bandwidths", 3GPP TSG-RAN WG1 Meeting #66, Athens, Greece, Aug. 22-26, 2011, 2 pages.
(Continued)

*Primary Examiner* — Brandon M Renner
(74) *Attorney, Agent, or Firm* — Kowert Hood Munyon Rankin and Goetzel PC; Jeffrey C. Hood; Luke S. Langsjoen

(57) ABSTRACT

This disclosure relates to providing system information for cell access to link budget limited devices. According to some embodiments, a base station may transmit an announcement information block (AIB) in a downlink shared data channel (e.g., PDSCH), wherein the AIB contains information useable by a UE in determining the location of system information in the downlink shared data channel. The UE can thus determine the location of and decode system information without having to decode a downlink control channel (e.g., PDCCH). This may be important for certain classes of devices, such as link budget limited devices, which have issues in decoding the downlink control channel. Improved paging scheduling techniques are also disclosed which more efficiently use PDCCH paging resources.

20 Claims, 5 Drawing Sheets

Related U.S. Application Data

(60) Provisional application No. 62/206,797, filed on Aug. 18, 2015.

(56) References Cited

U.S. PATENT DOCUMENTS

| | | |
|---|---|---|
| 8,885,560 B2 | 11/2014 | Wallen et al. |
| 9,078,253 B2 | 7/2015 | Li et al. |
| 10,104,686 B2 | 10/2018 | Petermann |
| 2006/0252377 A1 | 11/2006 | Jeong et al. |
| 2011/0019615 A1 | 1/2011 | Krco et al. |
| 2011/0110296 A1 | 5/2011 | Malladi |
| 2011/0149827 A1 | 6/2011 | Na et al. |
| 2011/0255486 A1 | 10/2011 | Luo et al. |
| 2012/0063321 A1 | 3/2012 | Chandrasekhar |
| 2013/0064119 A1 | 3/2013 | Montojo et al. |
| 2013/0208677 A1 | 8/2013 | Lee et al. |
| 2014/0044056 A1 | 2/2014 | Chen et al. |
| 2014/0057634 A1 | 2/2014 | Chang et al. |
| 2014/0198685 A1 | 7/2014 | Xu et al. |
| 2014/0198726 A1 | 7/2014 | Xu et al. |
| 2014/0293946 A1 | 10/2014 | Suzuki et al. |
| 2014/0307621 A1 | 10/2014 | Frenger et al. |
| 2014/0307697 A1 | 10/2014 | Beale |
| 2014/0334372 A1 | 11/2014 | Vos |
| 2015/0126206 A1 | 5/2015 | Krishnamurthy |
| 2015/0139175 A1 | 5/2015 | Ratasuk |
| 2015/0173039 A1 | 6/2015 | Rune |
| 2015/0181575 A1 | 6/2015 | Ng et al. |
| 2015/0223148 A1 | 8/2015 | Shi |
| 2015/0365968 A1 | 12/2015 | Kim |
| 2015/0382284 A1 | 12/2015 | Brismar |
| 2016/0134403 A1 | 5/2016 | Xiong |
| 2016/0212686 A1 | 7/2016 | Viorel et al. |
| 2016/0315752 A1 | 10/2016 | Chen et al. |
| 2016/0360551 A1 | 12/2016 | Bergman et al. |
| 2017/0048802 A1 | 2/2017 | Bucknell |
| 2017/0064764 A1 | 3/2017 | Ke |
| 2017/0201915 A1 | 7/2017 | Decarreau et al. |
| 2017/0230876 A1 | 8/2017 | Suzuki et al. |
| 2017/0230951 A1 | 8/2017 | Xiong et al. |
| 2017/0244529 A1 | 8/2017 | Yu et al. |
| 2017/0311319 A1 | 10/2017 | Lee |
| 2018/0007543 A1 | 1/2018 | Lee |
| 2018/0270634 A1 | 9/2018 | Kim |

FOREIGN PATENT DOCUMENTS

| | | |
|---|---|---|
| WO | 2009076997 | 6/2009 |
| WO | 2011038243 | 3/2011 |
| WO | 2013131262 | 9/2013 |
| WO | 2013183966 | 12/2013 |
| WO | 2015143244 | 9/2015 |

OTHER PUBLICATIONS

Office Action, Chinese Application for Invention No. 2016106811803, dated Mar. 15, 2019, five pages.
Office Action, Chinese Application for Invention No. 201680005196.0, dated Sep. 25, 2019, 12 pages.

NON-PDCCH SIGNALING OF SIB RESOURCE ASSIGNMENT

PRIORITY INFORMATION

This application is a continuation of U.S. patent application Ser. No. 15/175,102, entitled "Non-PDCCH Signaling of SIB Resource Assignment," filed Jun. 7, 2016, now U.S. Pat. No. 10,091,775, which claims priority to U.S. provisional patent application Ser. No. 62/206,797, entitled "Non-PDCCH Signaling of SIB Resource Assignment," filed Aug. 18, 2015, which are both hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to a system and method for providing system information for link budget limited wireless devices, as well as to improved paging scheduling for such devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices which may have limited capabilities, to relatively complex (e.g., potentially more expensive) devices which may have greater capabilities. Such devices may have different characteristics with respect to processing, memory, battery, antenna (power/range, directionality), and/or other capabilities. Devices which exhibit relatively limited reception and/or transmission capabilities (due to device design, current transmission medium conditions, and/or other factors) may be referred to in some instances as "link budget limited" devices.

SUMMARY

Embodiments are presented herein of methods for providing cell system information for link budget limited devices, and of devices (e.g., base stations, wireless devices) configured to implement the methods.

According to the techniques described herein, a base station may transmit an announcement information block (AIB) in a downlink shared data channel (e.g., PDSCH), wherein the AIB contains information useable by a wireless device in determining the location of system information in the downlink shared data channel. For example, the AIB may contain resource assignment information for system information block 1 (SIB-1). The wireless device can thus determine the location of and decode system information without having to decode a downlink control channel (e.g., PDCCH). This may be important for certain classes of devices, such as link budget limited devices, that have issues in decoding the downlink control channel.

The techniques described herein may be implemented in and/or used with a number of different types of devices, including but not limited to cellular base stations and/or other cellular network infrastructure equipment, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
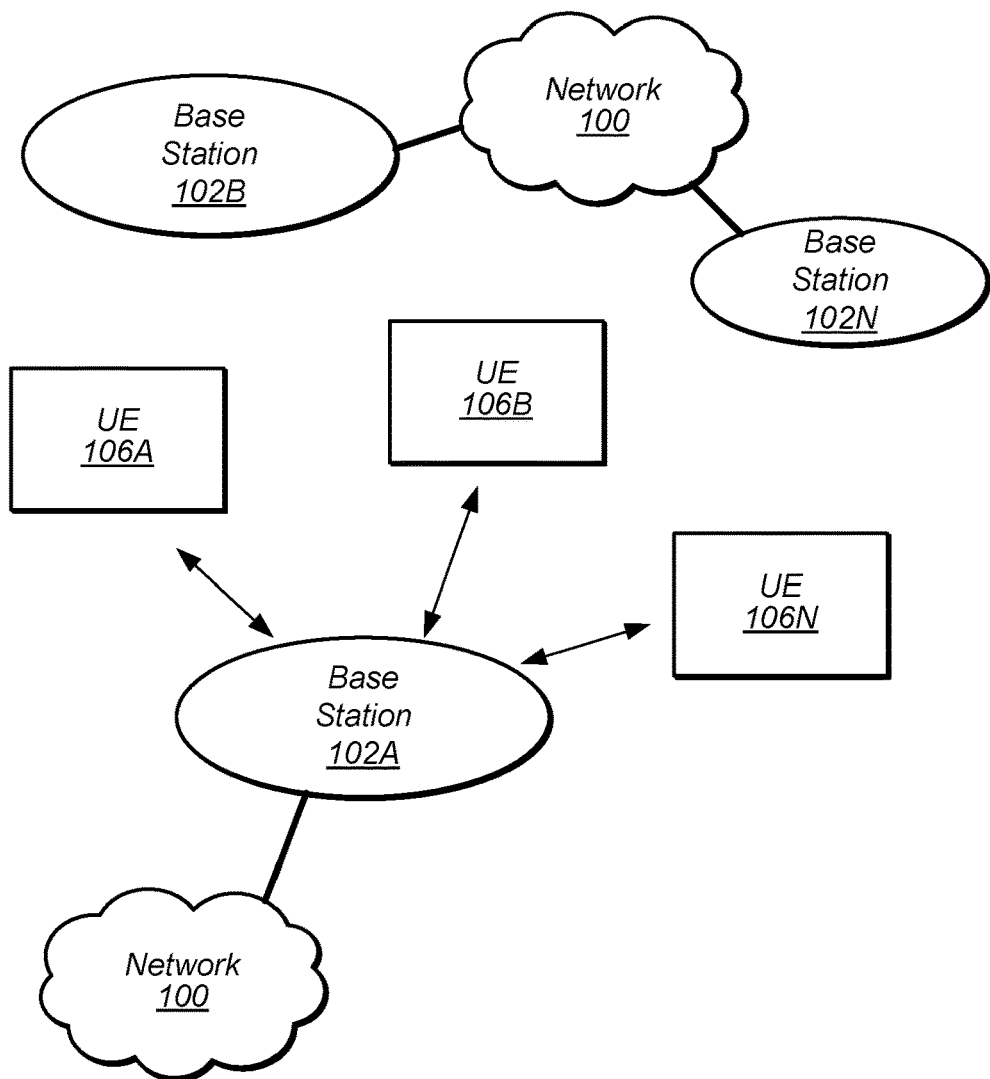
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2

UMTS: Universal Mobile Telecommunication System
EUTRA: Evolved UMTS Terrestrial Radio Access
GSM: Global System for Mobile Communications
LTE: Long Term Evolution
MIB: Master Information Block
NW: Network (cellular network)
PDCCH: Physical Downlink Control Channel
PDSCH: Physical Downlink Shared Channel
RAT: Radio Access Technology
RLF: Radio Link Failure
RRC: Radio Resource Control
RX: Receive
RLC: Radio Link Control
SI: System Information
SIB: System Information Block
SIB-1: System Information Block 1
TTI: Transmit Time Interval
TX: Transmit
UE: User Equipment Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
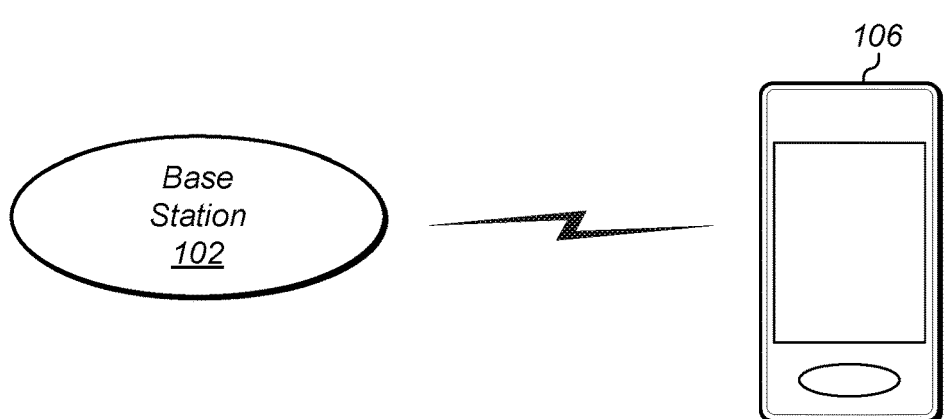
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more wireless communication standards.

Thus, while base station 102A may act as a "serving cell" for UEs 106A-N as illustrated in FIG. 1, each UE device 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
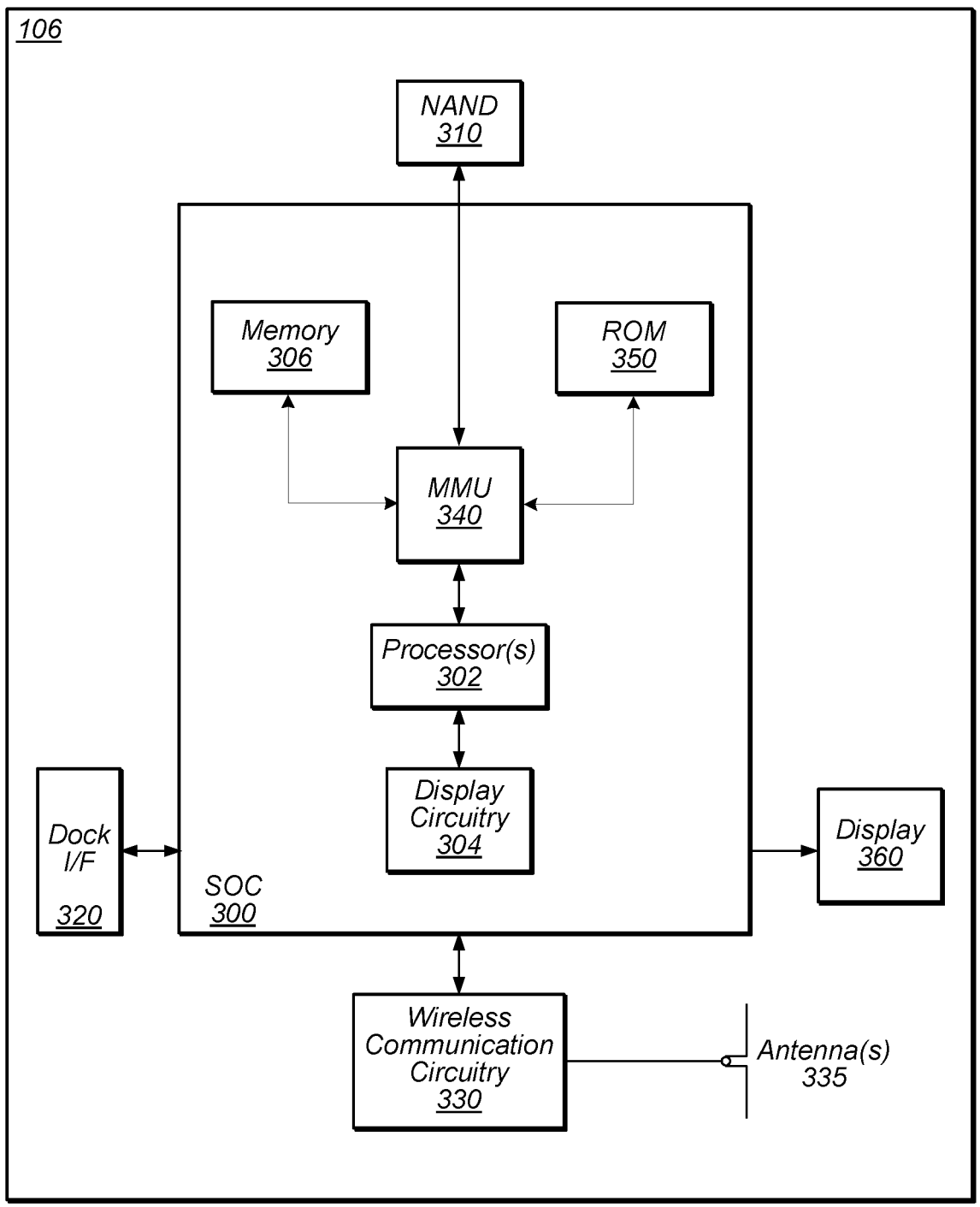
FIG. 3 illustrates an exemplary block diagram of a UE device, according to some embodiments.

FIG. 3—Exemplary Block Diagram of a UE Device

FIG. 3 illustrates an exemplary block diagram of a UE device 106, according to some embodiments. As shown, the UE device 106 may include a system on chip (SOC) 300, which may include portions for various purposes. For example, as shown, the SOC 300 may include processor(s) 302 which may execute program instructions for the UE device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE device 106. For example, the UE device 106 may include various types of memory (e.g., including NAND 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE device 106 may be configured to communicate wirelessly using multiple wireless communication technologies in some embodiments.

As described further subsequently herein, the UE device 106 may include hardware and software components for implementing or supporting implementation of features described herein, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
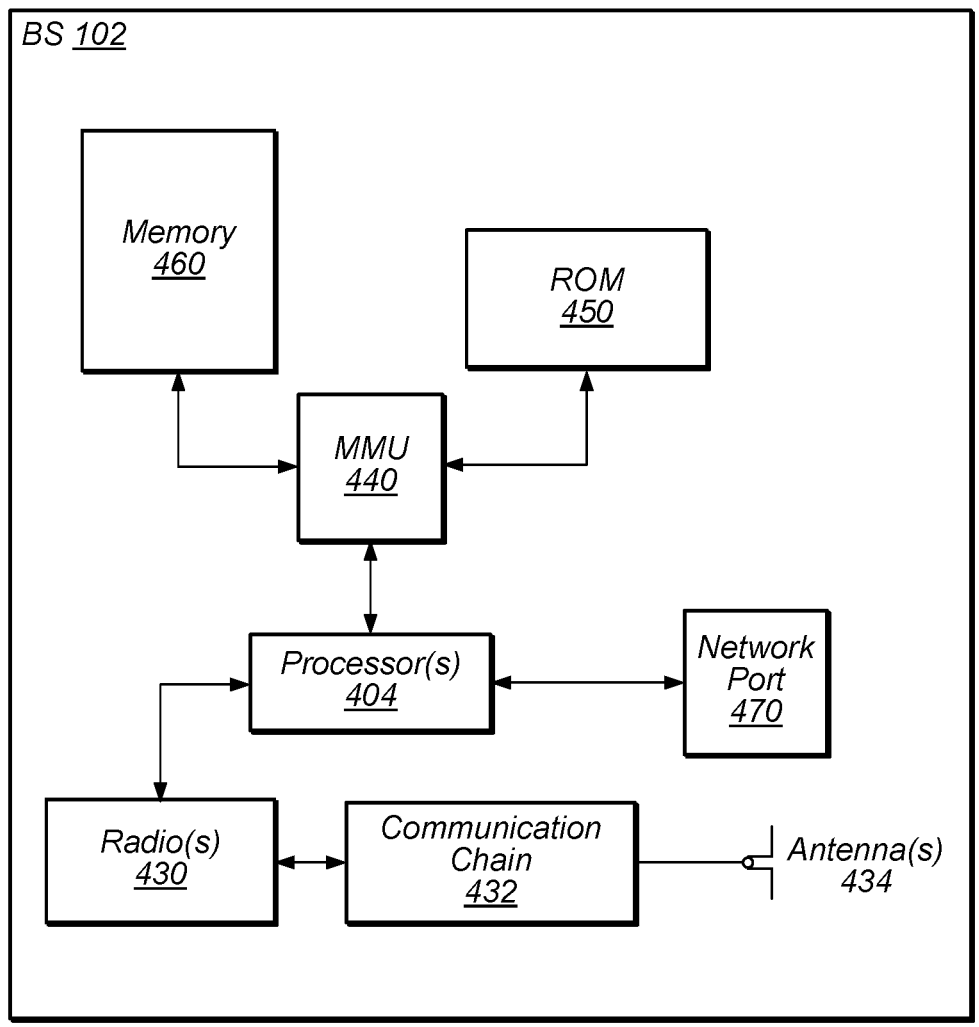
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication technologies, including, but not limited to, LTE, LTE-A, UMTS, CDMA2000, Wi-Fi, etc.

The BS 102 may be configured to communicate wirelessly using multiple wireless communication technologies. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Figure 5:
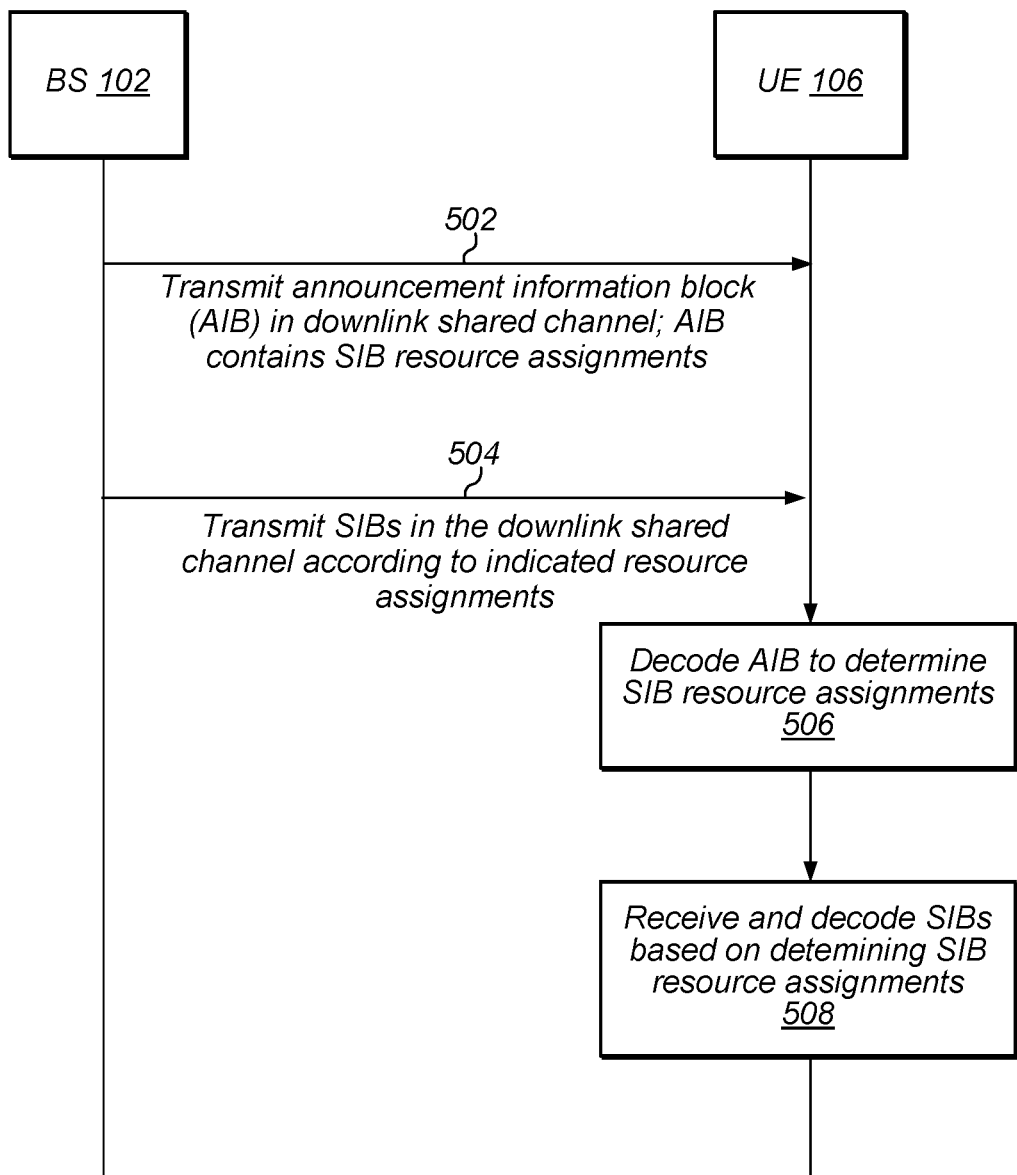
FIGS. 5-6 are a communication flow diagrams illustrating exemplary methods for providing system information to link budget limited devices, according to some embodiments.

The BS 102 may include hardware and software components for implementing or supporting implementation of features described herein, such as those described with respect to, inter alia, FIG. 5. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

System Information Signaling

In some telecommunications standards, such as LTE, the first step for a wireless device wishing to access a cell after cell search/cell acquisition may be decoding of the master information block (MIB) and the system information block(s) (SIBs) of the cell to which access is desired.

The MIB may typically be transmitted on the physical broadcast channel (PBCH), and may include information such as system bandwidth, system frame number (SFN), physical HARQ indicator channel (PHICH) configuration, and the number of transmit antennas used by the system.

The SIBs may typically be mapped onto radio resource control (RRC) system information messages transmitted on the physical downlink shared channel (PDSCH). SIBs may include a variety of information which may range from information necessary to access a cell to information for various cell re-selection procedures, among various other types of information. Therefore, in order to establish a connection to a cell or camp on a cell, the UE may be required to decode system information (SI) broadcast as system information blocks (SIB's).

Thus, at least a portion of the information in the MIB and SIBs for a cell may be important (or possibly essential) to a device wishing to access that cell. Accordingly, in order to facilitate cell access by devices (e.g., range constrained devices and/or those in poor RF conditions) which have limited link budgets, particularly as demand grows for inexpensive and limited capability devices, it may be desirable to provide mechanisms to improve the abilities of such devices to decode critical system access information.

In current telecommunication standard implementations, the resource assignment for SI is indicated in the control channel (e.g., PDCCH in LTE). The SI itself (containing one or more SIB's) is broadcast on the shared channel (e.g., PDSCH in LTE). In current implementations the "SIB-1" (which may include cell access related parameters and scheduling information for other SIBs, according to some embodiments) is transmitted as a separate SI at fixed TTI (transmit time interval) locations. Therefore, in current telecommunication implementations each UE may be required to monitor and decode the PDCCH to determine the resource assignment information of the system information (e.g., the various SIBs), which appears in the PDSCH. In other words, current implementations may require the UE to perform downlink control channel decoding (e.g., decoding of the PDCCH) in order for the UE to know the assignment of resources to system information in the downlink shared data channel (PDSCH). Knowing the resources assignment information of the SI, the UE can then proceed to decode the system information.

Link budget limited UE devices in a 3GPP network may have difficulty in decoding the control channel when the UE is located at further distances from the eNB in the cell. Therefore, improvements are desired which may allow certain UEs, such as link budget limited UEs, to determine the SI without having to perform control channel decoding, i.e., without having to decode the PDCCH.

One possible solution is for the locations of SIBs to be fixed and hence already known by both the UE's and the network. However, the eNB may desire to retain the flexibility to vary the resources assigned to SI in order to take advantage of frequency and time diversity and to counter inter-cell interference. Thus, in at least some embodiments, and from the network point of view, it may not be desirable to hinder this flexibility in SI resource assignment. Therefore, improved methods are desired.

FIG. 5—Non-PDCCH Signaling of SIB Resource Assignment Using an Announcement Information Block As noted above herein, according to some embodiments it may be advantageous to provide a way for certain UEs to locate and decode system information for accessing a cell without decoding control channel communications. FIG. 5 is a communication flow diagram illustrating a method for a base station 102 to signal resource assignments for system information for accessing a cell using an announcement information block (AIB), such that a wireless device 106 may be able to locate the system information without needing to decode a downlink control channel. Note that while elements of the method of FIG. 5 are described substantially with reference to the LTE wireless communication technology, part or all of the method may be used in conjunction with other wireless communication technologies (e.g., including future revisions to and/or successors of LTE), as desired.

The method shown in FIG. 5 may be used in conjunction with any of the computer systems or devices shown in the above Figures, among other devices. In various embodiments, some of the elements of the scheme shown may be performed concurrently, in a different order than shown, substituted for by other elements, or may be omitted. Additional elements may also be performed as desired. As shown, the scheme may operate as follows.

In 502, the base station 102 may transmit an announcement information block in a downlink shared channel. The AIB may indicate resource assignments for one or more SIBs, e.g., including at least a resource assignment for an SIB-1.

In some embodiments, the AIB may be broadcast by a network that serves a class of link-budget limited UEs, and may announce the support of coverage enhancement features for this class of UEs. In other words, the AIB may effectively announce that this eNB "caters" to this class of UE devices. The AIB may be broadcast on the PDSCH, and thus no decoding of the PDCCH may be necessary for decoding of the AIB.

The location of the AIB may be fixed, and may be similar to the location of a MIB, so that the location may be known a priori by all UE devices. In some embodiments, only a special class of UE devices (UEs designated as link budget limited) will decode the AIB. The AIB may thus be transmitted at known subframe/TTI locations in a frame and with known assignment of resources in the PDSCH. As one possibility, the assignment of resources and location may be a function of physical Cell-ID, e.g., in order to counter inter-cell interference. At least according to some embodiments, it may be the case that no PDCCH is associated with the AIB. In other words, the assignment of resources and location of transmission of SIBs may be a function of a cell specific value, such as physical Cell-ID. In some instances, the resource assignments may vary in a known deterministic pattern in order to achieve frequency and/or time diversity of these transmissions and combat inter-cell interference According to some embodiments, the AIB may typically have a small payload. In some embodiments the AIB may contain the resource assignments for some or all of the broadcast system information (SI) in the cell. If desired, the AIB may be power boosted, allocated enough resources for redundancy, and/or repeated enough times to help ensure that the link-budget limited UEs are able to reliably decode the AIB.

According to some embodiments, the system information (SI) maybe considered to be composed of two parts, these being the system information block 1 (SIB-1) and the remaining SIBs. The SIB-1 in LTE may have a special status and may be broadcast with a known periodicity and on known TTIs. Thus, the subframe where the SIB-1 is located may be known in advance, but the resource assignment of SIB-1 may not be known in advance. Accordingly, conventionally the UE has to decode the PDCCH in that particular sub-frame with a system information radio network temporary identifier (SI-RNTI) to determine the resource assignment of the SIB-1, which can then be used to find the SIB-1 in the PDSCH.

In at least some embodiments, the AIB includes the resource assignment or location of the SIB-1. Thus, when the link-budget limited UE decodes the AIB, it knows the resource assignments for SIB-1 in the shared channel. Thus, according to such embodiments, the UE may be able to determine the location of and to decode the SIB-1 in the PDSCH without decoding the associated PDCCH sent with a SI-RNTI. In other words, since the AIB contains the resource assignment of SIB-1, the UE can obtain this resource assignment from the AIB, and hence is not required to decode the PDCCH for this information.

In at least some embodiments, the AIB may in addition contain the resource assignment for other SI (e.g., SIBs other than SIB-1). In other words, resource assignments for other SIBs may also be indicated in the AIB, in addition to the resource assignment of SIB-1.

In some embodiments, the AIB is broadcast with one or more of: 1) enough resources, 2) enough repetitions, or 3) sufficient power boosting, so that the special class of UEs (e.g., link budget limited UEs) may be able to easily and successfully decode the AIBs.

As previously noted, the SIB-1 may contain the periodicities and windows (called SI-windows, and potentially including multiple subframes/TTIs) related to the location of other SIBs. However, the precise TTI(s) containing SI (and the TTIs containing its repetitions) within an SI-window may be uncertain (e.g., to allow flexible scheduling by the base station within the SI-window, which may in turn allow the base station to implement frequency diversity, time diversity, and/or inter-cell interference mitigation) and may conventionally be determined by decoding the PDCCH in an SI-window with a SI-RNTI.

Thus, a complication in the current telecom standard relates to where the UE is only provided an SI-window for the location of SI. Once the UE receives an SI-window, it may be required to search in each of the subframes for the SI. If the UE finds the SI-RNTI in the PDCCH, then the UE decodes the SIB.

In embodiments described herein, since the UE will not decode the PDCCH associated with the SIs, the associated uncertainly in the TTI may be resolved by the UE via blind decoding the resources assigned to the SI. Alternatively, if desired, in order to avoid placing blind decoding burden on the UE, the AIB may also contain information to eliminate the TTI uncertainty in the location of SI and its redundancy-version (RV) repetitions in the SI-window.

System information blocks may generally be transmitted more than once, e.g., with one or more redundancy version repetitions. The information contained in the AIB may be for the first such transmission, and according to some embodiments a formula or pattern may be used so that the UE can determine when the subsequent redundancy version repetitions are sent. For example, this formula may be used by the UE to determine when the next redundancy version of the same SIB is being sent. As discussed above, typically the eNB may desire to change the resource assignments of SI being transmitted to provide for frequency and/or time diversity and thus help prevent inter-cellular interference. Thus here the eNB and the respective class of UEs may have agreed on a predetermined formula to use in determining future resource assignments of SIB repetitions. This formula may be based on parameters provided in the AIB, and may be based on a chosen parameter, such as the cell-ID of the current cell in which the UE is operating. The redundancy versions themselves may also change with each version, e.g., in terms of the type/amount of coding used/RV, and this change in redundancy versions may also be based on a pre-determined pattern or formula.

The cycling of RVs in SI repetitions may be pre-determined. Instead of all SI-repetitions having the same resources-assignment, a pattern of assigned resources variation for SI-repetitions may be determined from the resource-assignment for the first SI (signaled in AIB) based on some parameter (such as the cell-ID). The varying pattern may be signaled to be "enabled" or "disabled" in the AIB.

Note that, if desired, in addition to the network transmission of AIBs discussed above herein, the network may continue to transmit resource assignment information in the PDCCH for decoding by UEs per current telecommunications standards. Thus the manner in which "normal" (e.g., non link budget limited) UEs decode the PDCCH to determine the location of SI may not be affected by at least some of the embodiments described herein. In other words, normal UEs, and possibly some link budget limited UEs as well, may continue to decode the PDCCH to determine the location of SI information in the PDSCH, per current standards.

In at least some embodiments, the AIB contains the resource assignment information for SIB-1 as noted above. As described above, the AIB may also contain the resource assignment information for a plurality of other SIBs as well. However, in these embodiments where the AIB contains resource assignment information for SIB-1 and a plurality of other SIBs, the AIB may become larger than desired. This may make the AIB more difficult to decode and/or may represent an inefficient usage of network resources.

In order to keep the size of the AIB small, and hence easier to decode, in at least some embodiments the AIB contains the resource assignment for SIB-1 and the resource-assignment information for only one additional SI (e.g., only one or a few additional SIBs). Therefore, unlike the first embodiment described above where the AIB included resource-assignment information for a plurality or all of the system information (SI), in this embodiment the AIB may only contain the resource-assignment information for the current SIB-1 and one additional SI (e.g., the next SI).

Each set of system information (SI) may arrive in a "window", referred to as an SI-window, composed of a number of subframes. The additional information contained in the AIB may be for the SI in the next SI-window. The information in the AIB may be changed a fixed number of TTI's before the next SI-window to reflect the resource-assignment for the SI in the next SI-window. For example, the AIB transmitted during an SI window may indicate the resource assignment for the SI in the next SI-window. Thus, since the information in the AIB may change every SI-window, the UE device may thus be required to decode AIB during each SI-window in which it intends to decode the SI in the next SI-window.

In this embodiment where the AIB is smaller, the UE may be required to decode the AIB in every SI-window. Since the AIB is smaller, a single SI-window may contain a sufficient number of repetitions of the AIB for proper decoding by a link budget limited UE.

Since the eNB scheduler may alter the resource-assignment (and location) of SI's, the content of the AIB may change accordingly. As part of the transmission protocol, such changes may be made at known occasions, e.g., modulo some "periodicity" and "offset" of the system-frame-number. Thus the eNB may make the SI scheduling changes at these occasions.

In 504, the base station 102 may transmit the SIBs in the downlink shared channel (e.g., PDSCH) according to the indicated resource assignments, e.g., including encoding the resources assigned to carry the SI with the SI.

In 506, a UE 106 receiving the AIB may decode the AIB. Based on the AIB, the UE 106 may be able to determine the SIB resource assignment(s) included in the AIB (e.g., potentially including resource assignment information for some or all of the SIBs, as discussed above, according to various embodiments).

In 508, the UE 106 may receive and decode SIBs transmitted by the base station 102 based on determining the SIB resource assignment(s) from the AIB. Thus, the UE 106 may be able to determine the resources assigned to the SI and decode those resources, and thus retrieve the SI, without decoding the downlink control channel (e.g., PDCCH).

Note that in some embodiments the eNB may power-boost any or all of the SI resources (e.g., the resource elements carrying the SI) in the PDSCH. The eNB may also transmit extra repetitions in time or frequency for the SI. Parameters for such repetitions may be pre-agreed as part of protocol (for use of link-budget limited UE devices) and/or may be signaled in the AIB. If desired, the eNB may determine (and/or share) the pattern for scheduling SIB repetition(s) based on the first assignment of a SIB; accordingly, in some embodiments, only the scheduling of the first transmission of such a SIB may be signaled in the AIB.

At least some embodiments of the methods described herein do not require any changes to the regular broadcast system information in a cell. Also, at least some embodiments described herein may eliminate the need to decode PDCCH for decoding the SI (e.g., instead the information will be signaled in the AIB for link-budget limited class of UE devices). Further, for at least some embodiments described herein, there is no implication for normal UE devices, i.e., normal UE devices (UE devices that are not link budget limited) are not affected and do not require any modifications to operate properly in a network implementing these embodiments.

Figure 6:
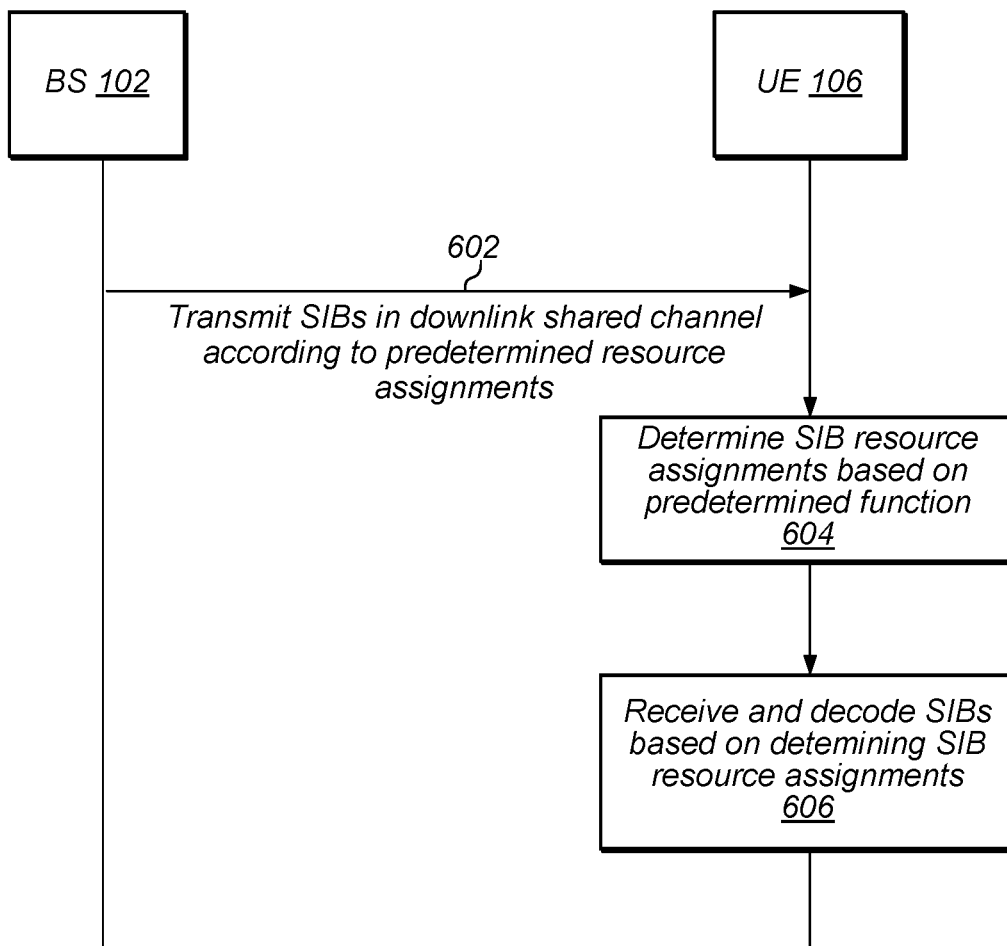

FIG. 6—SIB Resource Assignment Using Reserved Resources

While providing an AIB carried on a downlink control channel may represent one possible technique for enabling a wireless device to retrieve system information without requiring the wireless device to decode a downlink control channel, FIG. 6 is a communication flow diagram illustrating another possible technique, in which pre-determined resource assignments are utilized for transmitting system information. Note that while elements of the method of FIG. 6 are described substantially with reference to the LTE wireless communication technology, part or all of the method may be used in conjunction with other wireless communication technologies (e.g., including future revisions to and/or successors of LTE), as desired.

The method shown in FIG. 6 may be used in conjunction with any of the computer systems or devices shown in the above Figures, among other devices. In various embodiments, some of the elements of the scheme shown may be performed concurrently, in a different order than shown, substituted for by other elements, or may be omitted. Additional elements may also be performed as desired. As shown, the scheme may operate as follows.

In 602, a BS 102 may transmit SIBs in a downlink shared channel according to predetermined resource assignments. In at least some embodiments, a pre-agreement may be established between the eNB and link budget limited devices as to the location and resource-assignment of SIB's (so that these can be decoded without decoding the corresponding PDCCH). This pre-agreement method may relate to "special" SIBs that are sent in addition to regular SIBs, or may relate to pre-agreed transmission of regular SIBs. These "special" SIBs may be transmitted to a specific class of UEs (e.g., link budget limited UEs), and "normal" UEs may not be aware of these special SIBs. Alternatively, even normal UEs may be able to selectively utilize these special SIBs. These "special" SIBs may be transmitted at predetermined locations, e.g., every one second. These may have enough repetitions and power boostage such that the special class of UEs are able to decode them. Since these SIBs are in a fixed location in the PDSCH, this method also does not require decoding of the PDCCH.

The eNB may fix the resources used for the SIBs, e.g., the modulation and coding scheme (MCS) or resource blocks (RBs), for a certain number of SFN's that will be pre-determined (or pre-agreed upon). For example, if (SFN modulo 256)=0, then the eNB will send the SIBs in the first instance of TTIs agreed in the respective telecommunication specification, but will use a predefined resource allocation and TTI locations. Thus, a link-budget limited UE will not need to decode the PDCCH for these SIBs. Further, this method of pre-determined locations of SIBs may not utilize the broadcast of AIBs as described above with respect to FIG. 5. Alternatively, an information block may be transmitted to inform UE devices about support of link budget limited devices (e.g., in general and/or specifically with respect to provision of system information), from which UE devices may infer that pre-determined/pre-agreed time and frequency domain resource assignments are being used for the system information.

In order to create diversity against interference, the location of resource blocks (RBs) could be a function of the physical Cell-ID or some other parameter. Similarly, a pre-agreement on the TTIs containing the SIBs that will be power boosted can be implemented. This may operate to avoid wasting of NW resources, and only these pre-determined SIBs may be power boosted. The link-budget limited UEs may only decode the SIB in these pre-agreed SFN locations. This pre-agreement method may require the relaxation of the acquisition time.

In 506, a UE 106 may be able to determine the SIB resource assignment(s) for the SIBs transmitted by the BS 102. For example, the UE 106 may be able to utilize a predetermined function such as any of the above-described techniques for pre-agreeing upon resource locations of SIBs.

In 508, the UE 106 may receive and decode SIBs transmitted by the base station 102 based on determining the SIB resource assignment(s). Thus, the UE 106 may be able to determine the resources assigned to the SI and decode those resources, and thus retrieve the SI, without decoding the downlink control channel (e.g., PDCCH).

Paging Scheduling

At least some embodiments described herein may also provide for improved paging scheduling for link budget limited devices. For paging in RRC IDLE mode, the eNBs in the tracking area of a UE device may not have received measurement reports from the UE device (e.g., at least recently). Hence the eNB may not know if the UE device is in a coverage limited scenario, or even if the UE device remains in the eNB's cell at all. Thus the eNB may not be able to determine if power-boosting or increased resources/ repetitions are desired for the link-budget limited UE device. If the UE device is in fact no longer located in the cell of the eNB, then the eNB may undesirably waste valuable transmission resources attempting to communicate with the UE device. For example, at least in some instances, when the eNB chooses to "power boost" PDCCH resource elements (REs) containing a P-RNTI, the eNB is necessarily stealing power from other PDCCH REs (e.g., if the total transmit power over all REs is subject to a maximum due to regulations and/or for other reasons).

One current solution to this problem is for the MME to instruct an eNB of the last known cell where the UE device was present, to send paging message for the UE device. If the UE device does not respond, then the MME will instruct one or more other eNBs in the tracking area to attempt to page the UE device.

In some embodiments, the MME may inform the eNB when sending a page that the paging message is intended for the class of link-budget limited UEs. For example, the MME may inform the eNB when sending a page (which is broadcast to a plurality of UEs) that at least one of the target UE's is of a special class, e.g., is LBL. In order to limit the impact on NW resources, in some embodiments the eNB may power-boost and/or increase assigned resources (on PDCCH and PDSCH) for transmission of the page in steps (e.g., starting with normal power and resources and progressively increasing on subsequent paging attempts) and/or for up to a fixed/limited number of paging attempts.

A link-budget limited UE device may typically have smaller effective cell due to its reduced power/transmission capabilities. The UE device in many cases will undergo radio link failure (RLF) when moving from one cell to another cell. In this case, the UE device may establish a new RRC connection in the new cell, and thus the MME will get an update on the last cell in which the UE device was located. The MME while paging may first try only on the last known cell in which the UE device was located.

Figure 7:
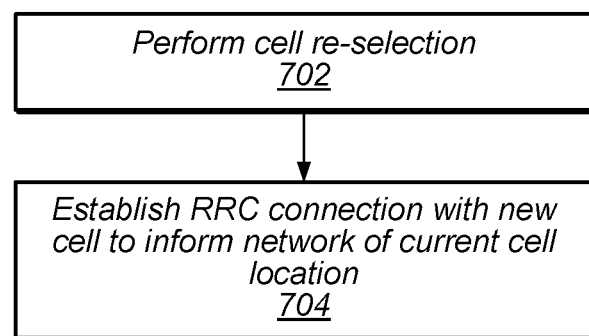
FIG. 7 is a flowchart diagram illustrating an exemplary method for improving the efficiency of paging scheduling of link budget limited devices, according to some embodiments.

FIG. 7 is a flowchart diagram illustrating a possible technique for reducing ambiguity with respect to which cell a link-budget limited UE device is located in, according to some embodiments. Note that while elements of the method of FIG. 7 are described substantially with reference to the LTE wireless communication technology, part or all of the method may be used in conjunction with other wireless communication technologies (e.g., including future revisions to and/or successors of LTE), as desired.

The method shown in FIG. 7 may be used in conjunction with any of the computer systems or devices shown in the above Figures, among other devices. In various embodiments, some of the elements of the method shown may be performed concurrently, in a different order than shown, substituted for by other elements, or may be omitted. Additional elements may also be performed as desired. As shown, the method may operate as follows.

In 702, a link-budget limited UE device may perform cell re-selection. For example, the UE device may be transported from the service area of one base station to the service are of another base station, determine to re-select to a cell provided by the new base station based on one or more cell signal strength metrics, cell signal quality metrics, and/or other cell re-selection triggers.

In 704, upon re-selecting to the new cell, the UE device may establish an RRC connection with the new cell to inform the cellular network of the current cell location of the UE device. This may allow the cellular network to use the cell location of the UE device to more efficiently use network resources in paging the UE device.

Thus, according to some embodiments, a UE device may operate to generally always establish an RRC connection when arriving within a new cell when performing cell-re-selection, thereby informing the MME of the UE device's location. In this way, the MME may always be knowledgeable about the cell-location of the UE device and thus the enhanced NW resources on paging may be used (if desired) for only one eNB in the tracking area. In other words, the MME may be able to instruct just the eNB providing the cell in which the UE is currently located to send a paging message, and the MME may not be required to instruct all of the eNBs in the tracking area to send these paging messages.

In the following further exemplary embodiments are provided.

One set of embodiments may include a method performed by a base station configured to serve a cell in a cellular network, comprising: by the base station: transmitting an information block (IB) comprising first information for accessing the cell, wherein the first information comprises a resource assignment for system information block 1 (SIB-1), wherein the information block is transmitted in a downlink shared data channel; and transmitting the SIB-1 in the downlink shared data channel.

According to some embodiments, the information block is useable by a user equipment (UE) to determine the resource assignment of the SIB-1, and hence a location of the SIB-1 in the downlink shared data channel, without requiring the UE to decode a downlink control channel.

According to some embodiments, transmitting the IB in the shared data channel is performed for a specific class of link budget limited UEs.

According to some embodiments, the first information comprises one or more resource assignments for one or more other system information blocks in addition to SIB-1.

According to some embodiments, the first information comprises a plurality of resource assignments for all system information blocks in addition to SIB-1.

According to some embodiments, the first information comprises only: 1) a first resource assignment for SIB-1; and 2) a second resource assignment for a second system information.

According to some embodiments, the method further comprises: by the base station: transmitting the resource assignment for the system information block 1 (SIB-)1 in a downlink control channel; wherein the resource assignment for the SIB-1 transmitted in the downlink control channel is useable by a user equipment (UE) to determine the resource assignment of the SIB-1, and hence a location of the SIB-1 in the downlink shared data channel; wherein the resource assignment for the SIB-1 transmitted in the downlink control channel is useable by UEs that are not link budget limited.

According to some embodiments, transmitting the information block (IB) comprising the first information comprises performing one or more of: 1) power boosting transmission of the IB in the downlink shared data channel; 2) transmitting one or more repetitions of the IB.

According to some embodiments, the downlink shared data channel is a physical downlink shared channel (PDSCH) of a telecommunications network; wherein the IB is an announcement information block (AIB).

Another set of embodiments may include a method performed by a base station configured to serve a cell in a cellular network, comprising: by the base station: transmitting, to a user equipment (UE), one or more system information blocks (SIBS) comprising first information for accessing the cell, wherein said transmitting the one or more SIBs is performed at predetermined times known by the base station and the UE, wherein said transmitting is performed on a downlink shared data channel; and wherein the one or more SIBs are decodable by the UE without requiring the UE to decode a downlink control channel.

According to some embodiments, said transmitting is performed at resource blocks determined as a function of a predetermined parameter.

According to some embodiments, the predetermined parameter is a cell ID of the cell in which the UE is currently operating.

A further set of embodiments may include a base station configured to serve a cell in a cellular network, comprising: an antenna; a radio coupled to the antenna; and a processing element operably coupled to the radio; wherein the base station is configured to perform cellular communications to user equipment (UEs) in the cellular network; wherein the base station is configured to implement any of the methods of the preceding examples.

Another set of embodiments may include an integrated circuit for use in a base station, wherein the integrated circuit is configured to implement any of the methods of the preceding examples.

A still further set of embodiments may include a method performed by a user equipment operating in a cellular network, the method comprising: by the user equipment: performing a cell search; acquiring a cell associated with a base station based on the cell search; receiving, from the base station, an information block (IB) comprising first information for accessing the cell, wherein the first information comprises a resource assignment for system information block 1 (SIB-1), wherein the information block is received in a downlink shared data channel; receiving, from the base station, the SIB-1 in the downlink shared data channel; determining the resource assignment of the SIB-1, and hence a location of the SIB-1 in the downlink shared data channel, without requiring decoding by the UE of a downlink control channel.

According to some embodiments, the first information comprises one or more resource assignments for one or more other system information blocks in addition to SIB-1.

According to some embodiments, the first information comprises a plurality of resource assignments for all system information blocks in addition to SIB-1.

According to some embodiments, the first information comprises only: 1) a first resource assignment for SIB-1; and 2) a second resource assignment for a second system information.

A yet further set of embodiments may include a method performed by a user equipment operating in a cellular network, the method comprising: by the user equipment: performing a cell search; acquiring a cell associated with a base station based on the cell search; receiving, from a base station, one or more system information blocks (SIBs) comprising first information for accessing the cell, wherein said receiving the one or more SIBs is performed at predetermined times known by the base station and the UE, wherein the one or more SIBs are received on a downlink shared data channel; and wherein the one or more SIBs are decoded by the UE without the UE decoding a downlink control channel.

According to some embodiments, the one or more SIBs are located at resource blocks determined as a function of a predetermined parameter.

According to some embodiments, the predetermined parameter is a cell ID of the cell in which the UE is currently operating.

Yet another set of embodiments may include a user equipment, comprising: an antenna; a radio coupled to the antenna; and a processing element operably coupled to the radio, wherein the user equipment is configured to implement any of the methods of the preceding examples.

A further set of embodiments may include an integrated circuit for use in a user equipment, wherein the integrated circuit is configured to implement any of the methods of the preceding examples.

A still further set of embodiments may include a user equipment, comprising: an antenna; a radio coupled to the antenna; and a processing element operably coupled to the radio, wherein the user equipment is configured to: perform a cell re-selection to acquire a new cell in the cellular network; in response to performing the cell re-selection, establish a radio resource control (RRC) connection with the new cell, thereby informing the cellular network about a cell location of the UE; wherein the cellular network is operable to use the cell location to more efficiently use network resources in paging the UE.

According to some embodiments, the UE is link budget limited.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device, comprising:
an antenna;
a radio coupled to the antenna; and
a processing element operably coupled to the radio,
wherein the UE device is configured to:
   perform a cell search;
   acquire a cell associated with a base station based on the cell search;
   receive, from the base station, an information block (IB) comprising first information for accessing the cell, wherein the first information comprises a resource assignment for system information block 1 (SIB-1);
   determine the resource assignment of the SIB-1 in a downlink shared data channel based on the IB and without decoding an associated downlink control channel; and
   receive, from the base station, the SIB-1 in the downlink shared data channel in accordance with the determined resource assignment of the SIB-1.

2. The UE device of claim 1, wherein the first information comprises one or more resource assignments for one or more other system information blocks in addition to SIB-1, wherein the UE device is further configured to:
   determine the one or more resource assignments of the one or more other system information blocks in the downlink shared data channel based on the IB; and
   receive, from the base station, the one or more other system information blocks in the downlink shared data channel in accordance with the determined one or more resource assignments of the one or more other system information blocks.

3. The UE device of claim 1,
wherein the IB further comprises information indicating a pattern of assigned resources for one or more system information block repetitions.

4. The UE device of claim 1,
wherein the UE device is of a class of link budget limited UE devices, and the IB is an enhancement feature for the class of link budget limited UE devices.

5. The UE device of claim 1,
wherein the downlink control channel is a physical downlink control channel (PDCCH), and no PDCCH is associated with the IB.

6. The UE device of claim 1, wherein the UE device is further configured to:
receive one or more repetitions of the IB.

7. The UE device of claim 1,
wherein the downlink shared data channel is a physical downlink shared channel (PDSCH) of a telecommunications network.

8. A user equipment (UE) device, comprising:
an antenna;
a radio coupled to the antenna; and
a processing element operably coupled to the radio,
wherein the UE device is configured to:
   receive an information block (IB) comprising first information for accessing the cell, wherein the first information comprises resource assignments for at least two system information blocks (SIBs), wherein the IB is transmitted in a downlink shared data channel; and
   receive the at least two SIBs in the downlink shared data channel,
   wherein the information block is useable to determine the resource assignments of the at least two SIBs, and hence locations of the at least two SIBs in the downlink shared data channel, without decoding an associated downlink control channel.

9. The UE device of claim 8,
wherein the UE device is of a class of link budget limited UE devices, and the IB is an enhancement feature for the class of link budget limited UE devices.

10. The UE device of claim 8,
wherein the first information comprises resource assignments for all other SIBs for the cell for a class of link budget limited UE devices.

11. The UE device of claim 8,
wherein the downlink control channel is a physical downlink control channel (PDCCH), and no PDCCH is associated with the IB.

12. The UE device of claim 10,
wherein the IB further comprises information indicating a redundancy version (RV) pattern for one or more system information block repetitions.

13. The UE device of claim 8, wherein UE device is further configured to:
receive an updated IB comprising modified resource assignments for the at least two SIBs; and
receive the one or more SIBs having modified resource assignments.

14. The UE device of claim 8, wherein the UE device is further configured to:
receive one or more repetitions of the IB.

15. The UE device of claim 8,
wherein the downlink shared data channel is a physical downlink shared channel (PDSCH) of a telecommunications network.

16. The UE device of claim 8,
wherein the IB further comprises information indicating a pattern of assigned resources variation for one or more system information block repetitions.

17. A method for operating a user equipment (UE) device, the method comprising:

performing a cell search;

acquiring a cell associated with a base station based on the cell search;

receiving, from the base station, an information block (IB) comprising first information for accessing the cell, wherein the first information comprises a resource assignment for system information block 1 (SIB-1);

determining the resource assignment of the SIB-1 in a downlink shared data channel based on the IB and without decoding an associated downlink control channel; and receiving, from the base station, the SIB-1 in the downlink shared data channel in accordance with the determined resource assignment of the SIB-1.

18. The method of claim 17, wherein the first information comprises one or more resource assignments for one or more other system information blocks in addition to SIB-1, wherein the method further comprises:

determining the one or more resource assignments of the one or more other system information blocks in the downlink shared data channel based on the IB; and receiving, from the base station, the one or more other system information blocks in the downlink shared data channel in accordance with the determined one or more resource assignments of the one or more other system information blocks.

19. The method of claim 17,
wherein the IB further comprises information indicating a pattern of assigned resources for one or more system information block repetitions.

20. The method of claim 17,
wherein the UE device is of a class of link budget limited UE devices, and the IB is an enhancement feature for the class of link budget limited UE devices.

* * * * *